United States Patent

Vaxelaire

[11] Patent Number: 5,556,154
[45] Date of Patent: Sep. 17, 1996

[54] VISOR WITH TWO-PART CORE

[75] Inventor: Francis Vaxelaire, Vesoul, France

[73] Assignee: Gebr. Happich GmbH, Germany

[21] Appl. No.: 328,862

[22] Filed: Oct. 25, 1994

[51] Int. Cl.$^6$ ............................................. B60J 3/00
[52] U.S. Cl. ............................................. 296/97.1; 403/383
[58] Field of Search .......................... 296/97.1; 403/361, 403/383

[56] References Cited

U.S. PATENT DOCUMENTS

| | | | |
|---|---|---|---|
| 3,827,748 | 8/1974 | Herr et al. | 296/97.1 |
| 4,570,990 | 2/1986 | Flowerday . | |
| 4,763,946 | 8/1988 | Robbins et al. . | |
| 4,890,875 | 1/1990 | Takahashi | 296/97.1 |
| 5,308,136 | 5/1994 | Schwarz et al. | 296/97.1 |

FOREIGN PATENT DOCUMENTS

| | | | |
|---|---|---|---|
| 2231309 | 1/1974 | Germany | 296/97.1 |
| 1214327 | 12/1970 | United Kingdom | 296/97.1 |

Primary Examiner—Dennis H. Pedder
Attorney, Agent, or Firm—Ostrolenk, Faber, Gerb & Soffen, LLP

[57] ABSTRACT

A visor has a core formed of two halves which are bonded together to form the core. Each of the two halves is formed of a thermoplastic material by an injection molding process. Each is formed with aligning members on a respective interior or facing surface. The aligning members of the two core halves cooperate to align the two halves and then the two halves are bonded together. The aligning members are located along substantially the entire surface of the two core halves to provide accurate alignment between the two core halves. Each of the two core halves is covered with a cloth layer before the two core halves are bonded together.

11 Claims, 2 Drawing Sheets

VISOR WITH TWO-PART CORE

BACKGROUND OF THE INVENTION

The present invention relates to a visor for a vehicle, and more particularly, to a visor having a two part core and relates to a method for forming the visor core.

A conventional visor, such as that disclosed in U.S. Pat. Nos. 4,570,990 and 4,763,946, has a core having a clam shell arrangement. The core is formed by two separate halves of polymeric material which are joined side-by-side by a hinge located between the two core halves. An outer side of each of the two halves is covered with a vinyl or upholstery material cover that includes a foam layer. The cover is wrapped around an outer surface of each of the two halves so that excess material of the cover is inserted into an inner surface of each of the halves. The excess cover material is bonded to the inner surfaces of the two halves to secure the cover to the core.

Once the cover has been bonded onto the two core halves, the two halves are folded together by pivoting the two halves about the hinge located between them. The core halves are then heated by direct heating to melt the polymeric material and to thereby permanently join the core halves.

However, a visor core formed by the process described above requires the use of a hinge which must be formed and then connected to each of the two core halves so that the core halves will be aligned relative to each other which ensures accurate alignment of the core halves when the core halves are joined to form the core. Thus, the use of a hinge increases the cost and manufacturing steps required to form a visor core. In addition, the hinge does not always provide accurate alignment between the two core halves because the two core halves are aligned only along a single line where the hinge is located.

SUMMARY OF THE INVENTION

It is an object of the present invention to provide a vehicle visor having a core that is lightweight and has structural integrity and a desired softness.

It is also an object of the present invention to provide a visor having a core formed by two separate elements each having alignment members.

It is a further object of the present invention to provide a visor core formed of two separate elements that are joined together without the use of a hinge.

It is also an object of the present invention to provide a method for forming a visor core.

The visor core according to a preferred embodiment of the present invention includes two separate core halves. One of the two halves is preferably formed of a thermoplastic material, such as polypropylene, by injection molding.

It is preferable that a first half of the core be formed of a concentrated polypropylene material.

The second core half is also preferably formed of a thermoplastic material by injection molding. It is preferable that the second core half be formed of a material including polypropylene and talc.

Each of the two halves forming the core preferably has aligning members for aligning the core halves relative to each other. It is preferred that the aligning members of each of the first and second core halves extend along substantially the entire surface of each of the first and second core halves so that the core halves are accurately aligned relative to each other along the entire surface of the core.

Each of the aligning members of the first and second halves is formed during the injection molding process. Each of the aligning members is formed as a plurality of raised members separated by a plurality of recessed members. The aligning members of the first core half are configured to engage with the aligning members of the second core half so that when the first and second core halves are joined together, the engaged aligning members cooperate to accurately position the two core halves relative to each other along substantially the entire surface of the core.

After the first and second core halves are formed, the outer surfaces of each of the core halves are covered with a cloth layer. That cloth may preferably be a polyamide or polyester material. The first core half is preferably covered with the polyamide or polyester material. The second core half is preferably covered with a polyamide or polyester material having a polyester foam backing layer to provide desired softness on the side of the core that faces away from a vehicle ceiling and toward the vehicle occupants. The polyamide or polyester material used for covering the first core half may also be formed with a polyester foam backing layer, if desired.

The cover material is wrapped around an outer surface of each of the core halves and excess cover material is inserted into the interior surfaces of the core halves. The excess cover material is then edge-crimped into the shell. The cover material is bonded to the core halves by high frequency welding, hot bonding or other suitable bonding processes.

Once the cover material has been secured to the two core halves, the core halves are joined together by engaging the aligning members of each of the two core halves relative to each other. After the two core halves are accurately positioned relative to each other by their respective aligning members, the two core halves are secured together by mirror welding or some other suitable joining process.

Other features and advantages of the present invention will become apparent from the following description of the invention which refers to the accompanying drawings.

DETAILED DESCRIPTION OF THE PREFERRED EMBODIMENTS

Figure 1:
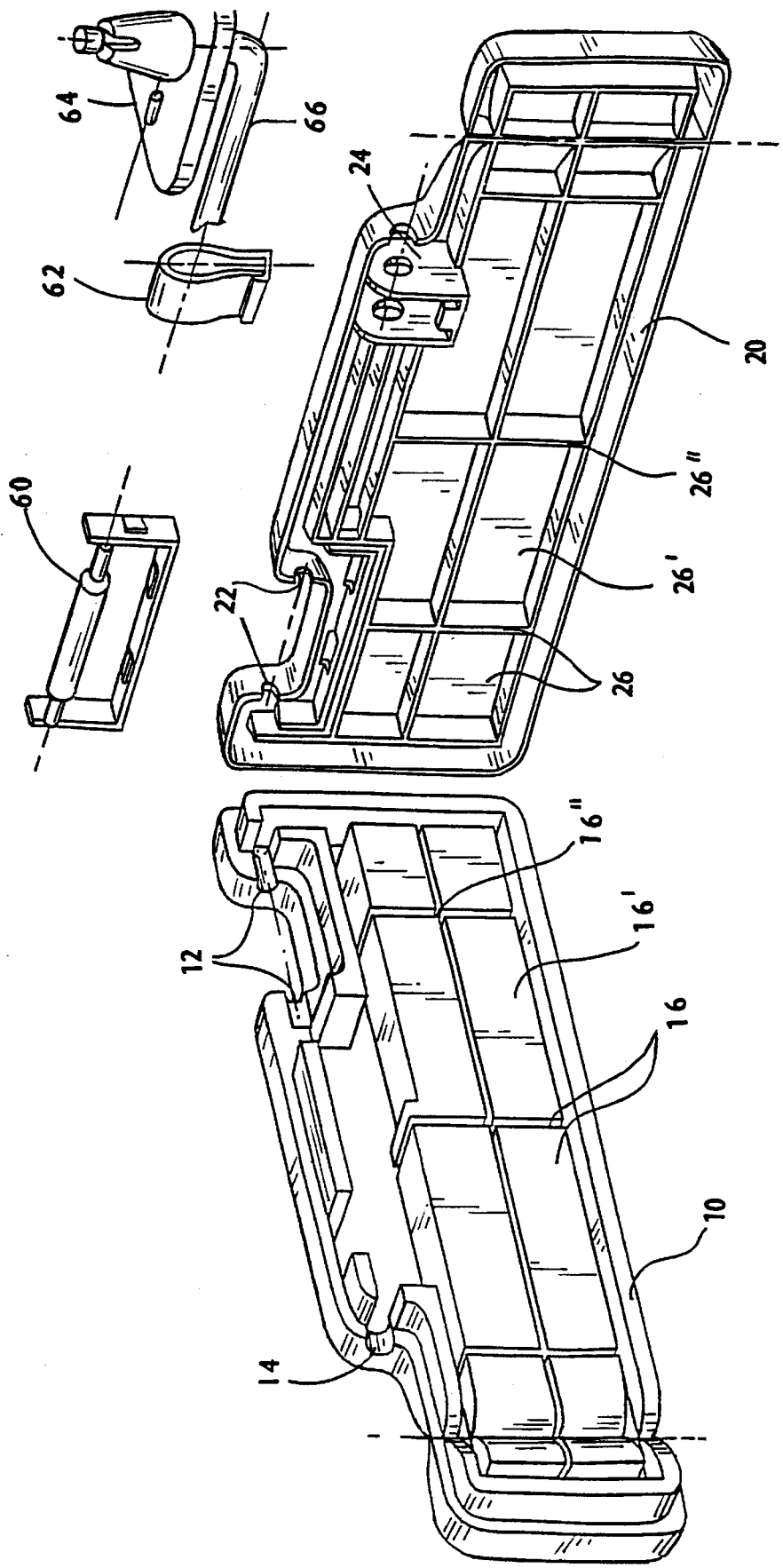
FIG. 1 is an exploded detail view of the two halves of the core according to one embodiment of the present invention.

A preferred embodiment of a core for a vehicle visor is shown in FIG. 1. The core is formed from a first core half 10 and a second core half 20.

The first core half 10 is formed of a thermoplastic material, such as polypropylene, by injection molding. The polypropylene provides the core with several advantages such as sufficient rigidity, light weight and structural stability. In addition, the polypropylene allows the core to be recyclable. The injection molding process allows the core halves to be formed with different thicknesses, as desired, and to accommodate various design changes such as incorporating plastic hinges for mounting the visor or a mirror mounting assembly for mounting a vanity mirror. It is preferable that first core half 10 be formed of a concentrated polypropylene material.

The first core half 10 includes a first recess 12 for receiving a counterbearing pin, described below. The first core half 10 also includes a second recess 14 for receiving a spring clip, also described below.

The first core half 10 has a plurality of aligning members 16 formed on and projecting out from its interior surface. The aligning members 16 are formed during the injection molding process so that the aligning members 16 and the remaining structure of the first core half 10 are of a one piece construction. The aligning members 16 include a plurality of raised members or plates 16' and a plurality of narrow recesses 16" formed between the plates 16' on the interior surface of the first core half 10. The recesses 16" are positioned between adjacent raised members 16' for accommodating aligning members of the second core half, as described below. Although the raised members 16' forming the aligning members are rectangular shaped members and are arranged in two rows, any suitable geometric shape and arrangement of the raised members and recesses suitable for aligning the two core halves can be used in forming the aligning members 16.

The second core half 20 is also formed of a thermoplastic material by injection molding. It is preferable that the second core half 20 be formed of a material including polypropylene and talc. In a preferred embodiment, the material for forming the second core half 20 comprises about 80% polypropylene and 20% talc.

The second core half 20 has a first recess 22 for receiving a counterbearing pin, described below. The second core half 20 also includes a receiving member 24 for receiving a spring clip, described below.

The second core half 20 also has a plurality of aligning members 26 formed on its interior surface during the injection molding process so that the aligning members 26 and the remaining structure of the first core half 20 are of a one piece construction. The aligning members 26 include a plurality of recesses 26' and with a plurality of raised members 26" between the recesses 26' which are both formed on the interior surface of the second core half 20. The rectangular recesses 26' are formed between adjacent raised members 26". The raised members 26" are so positioned and shaped as to be engageable with the recesses 16" of the first core half 10. Similarly, the recesses 26' are so positioned and shaped as to be engageable with the raised members 16' of the first core half 10. As mentioned above, although the recesses 26' and raised members 26" forming the aligning members are rectangular members and are also arranged in two rows, any suitable geometric shape and arrangement suitable for aligning the two core halves can be used to form the aligning members 26.

Both sets of aligning members 16', 16" and 26', 26" are formed so that when the two core halves 10, 20 are joined together, the aligning members 16', 16", 26', 26" cooperate to accurately position the two core halves 10, 20 relative to each other to form a visor core.

Thus, the aligning members 16', 16" and 26' 26" are easily formed during the injection molding process. They eliminate the need for a separate hinge to be formed and connected to the two core halves as is required in conventional visor cores. Also, aligning members 16', 16" and 26', 26" provide a more accurate alignment between the first and second core halves 10, 20 because the core halves are aligned at various portions along substantially the entire surface of each of the two core halves rather than at a single location or two locations where a hinge or hinges attach the two cores together, as in conventional devices.

Each core half 10, 20 has a respective recess 12, 22 for receiving a counterbearing pin 60 for mounting the visor on a vehicle ceiling. In addition, the core halves 10, 20 are formed with a recess 14 and a receiving member 24, respectively, for receiving a spring clip 62 through which the visor is attached to bearing bracket 64 and a shaft 66 which attaches the visor to the vehicle ceiling and allows the visor to pivot about the shaft 66.

Figure 2:
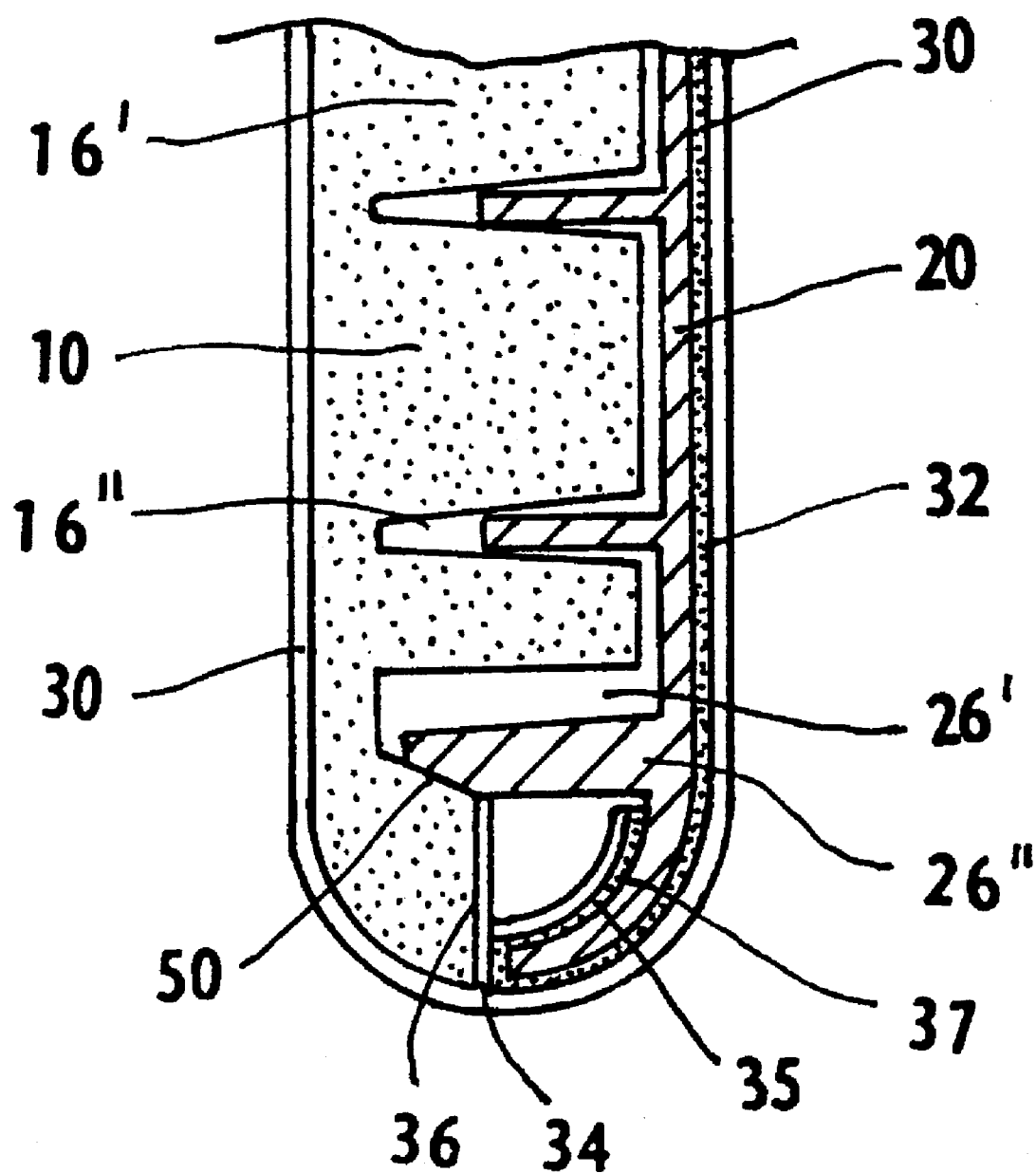
FIG. 2 is a partial side view of the core of FIG. 1 having two separate core halves bonded together.

After the first and second core halves 10, 20 are formed, each core half is covered with a cloth layer 30 seen in FIG. 2. The cloth 30 for covering the core halves may preferably be of a polyamide or polyester material. The first core half 10 is covered with only the polyamide or polyester material layer 30. The second core half 20 is covered with a polyamide or polyester material layer 30 having a polyester foam backing layer 32 to provide a desired softness on the side of the core that faces away from a vehicle ceiling.

The cover material layer 30 is wrapped around an outer surface of the first core half 10, and excess cover material 34 is inserted into the interior surface of the first core half. The excess cover material 34 is then edge-crimped into the interior surface of the first core half 10. The cover material 30 is then bonded to the first core half 10 by hot bonding 36 or by any other suitable bonding process. The polypropylene material used to form the first core half 10 fuses to the cover material 30 during the hot bonding process to secure the cover to the first core half 10.

The cover material 30 having a polyester foam backing layer 32 is wrapped around an outer surface of the second core half 20, and excess cover material 35 is inserted into the interior surface of the second core half 20. The excess cover material 35 is then edge crimped into the interior surface of the second core half 20. The cover material 30 having the polyester foam backing layer 32 is then bonded to the second core half 20 by high-frequency welding 37 or any other suitable bonding process. The polypropylene material used to form the second core half 20 adheres to the foam backing layer 32 during the high frequency welding process to secure the cover to the second core half 20.

After each of the core halves 10, 20 is covered, the core halves 10, 20 are joined together by engaging the aligning members 16', 16" and 26', 26" relative to each other as seen in FIG. 2. As discussed above, the aligning members 16', 16" and 26', 26" accurately align the two core halves 10, 20 relative to each other along substantially the entire surface of the core. After the two core halves 10, 20 have been accurately positioned relative to each other by the respective aligning members 16', 16" and 26', 26", the two halves are secured together by mirror welding 50 or some other suitable joining process.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A visor core comprising:

a first core half and a second core half each formed of a thermoplastic material, the first core half being a completely separate element from the second core half whereby before being joined together, the core halves are unattached;

each of the first and second core halves having a respective inner surface facing toward the other inner surface of the other core half and each core half also having a respective opposite outer surface;

the separate core halves being joined together with their inner surfaces engaged;

first aligning members disposed over substantially the entire surface of the inner surface of the first core half;

second aligning members located on the inner surface of the second core half and the second aligning members being shaped for engaging with the first aligning members for aligning the second core half relative to the first core half;

wherein when the separate first and second core halves are joined together, the core halves are aligned by the engagement of the first aligning members with the second aligning members.

2. The visor core of claim 1, further comprising a respective first and second cover layer for covering the outer surface of each of the first and second core halves, respectively.

3. The visor core of claim 2, wherein the first cover layer comprises a polyamide cloth and the second cover layer comprises a polyamide cloth having a polyester foam backing.

4. The visor core of claim 1, wherein each of the first and second core halves is formed to have a first recess for accommodating a counterbearing pin and a second recess for accommodating a mounting spring clip for mounting the visor core on a vehicle ceiling.

5. The visor core of claim 1, wherein the thermoplastic material comprises polypropylene.

6. The visor core of claim 1, wherein the first core half is formed of polypropylene.

7. The visor core of claim 6, wherein the second core half is formed of about 20 percent talc and about 80 percent polypropylene.

8. The visor core of claim 1, wherein the second core half is formed of about 20 percent talc and about 80 percent polypropylene.

9. The visor core of claim 1, wherein the first aligning members comprise a plurality of first raised members separated by a plurality of first grooves which are shaped and positioned to engage with the second aligning members.

10. The visor core of claim 9, wherein the second aligning members comprises a plurality of second raised members separated by a plurality of second grooves formed and positioned to engage in complementary manner with the first raised members into the second grooves and the second raised members into the first grooves.

11. The visor core of claim 10, wherein the first raised members are each of generally rectangular cross-section and are separated from adjacent first raised members by the first grooves which are of relatively narrow width;

the second grooves being aligned with the first raised members and the second grooves being of generally rectangular cross-section and corresponding in shape and position with the first raised members; and the second raised members being of narrow width, being disposed between the second grooves and being shaped and positioned on the second core half to be received in the respectively positioned narrow width first grooves;

whereby the raised members on each core half are received in the grooves in the other core half.

* * * * *